(12) United States Patent
Myers et al.

(10) Patent No.: US 7,287,727 B2
(45) Date of Patent: Oct. 30, 2007

(54) AIRCRAFT EVACUATION SLIDE INFLATOR HAVING VALVE LEAKAGE TRAP AND SAFETY VENT

(75) Inventors: Kevin Myers, Phoenix, AZ (US); Richard B. Yori, Akron, OH (US); Peter Seabase, Cuyahoga Falls, OH (US); Christopher J. Bock, Phoenix, AZ (US)

(73) Assignee: Goodrich Corporation, Charlotte, NC (US)

( * ) Notice: Subject to any disclaimer, the term of this patent is extended or adjusted under 35 U.S.C. 154(b) by 328 days.

(21) Appl. No.: 11/170,871

(22) Filed: Jun. 30, 2005

(65) Prior Publication Data

US 2007/0023578 A1 Feb. 1, 2007

(51) Int. Cl.
*B64D 25/14* (2006.01)
(52) U.S. Cl. .................. 244/137.2; 244/905; 193/25 B
(58) Field of Classification Search ............ 244/137.2, 244/905; 182/48; 193/5, 25 B
See application file for complete search history.

(56) References Cited

U.S. PATENT DOCUMENTS 4,269,386 A * 5/1981 Crowe .................... 251/74
6,431,197 B2 8/2002 Hintzman et al. .......... 137/71
6,659,404 B1 12/2003 Roemke ................. 244/137.2
7,032,778 B2 4/2006 Bock et al. ................. 222/3

* cited by examiner

Primary Examiner—Rob Swiatek
(74) Attorney, Agent, or Firm—Jerry J. Holden; John D. Titus

(57) ABSTRACT

An inflatable aircraft evacuation slide system includes a primary valve, a bust disk and a valve leakage trap operatively disposed between the primary valve and the burst disk. The valve leakage trap comprises a small exhaust vent opening into a flow restriction orifice in the gas path between the primary valve and the burst disk. In operation, when the aircraft emergency exit is opened in the armed condition, the primary valve opens and pressurizes the chamber until the burst disk ruptures allowing inflation gases to pass through the flow restriction orifice to inflate the inflatable evacuation slide. Because there is a substantial pressure drop across the flow restriction orifice, the presence of the valve leakage safety vent in the orifice does not result in significant loss of inflation gas needed for inflating the inflatable evacuation slide. In the event of leakage past the primary valve, however, the valve leakage trap safely vents the leakage pressure to the atmosphere.

12 Claims, 3 Drawing Sheets

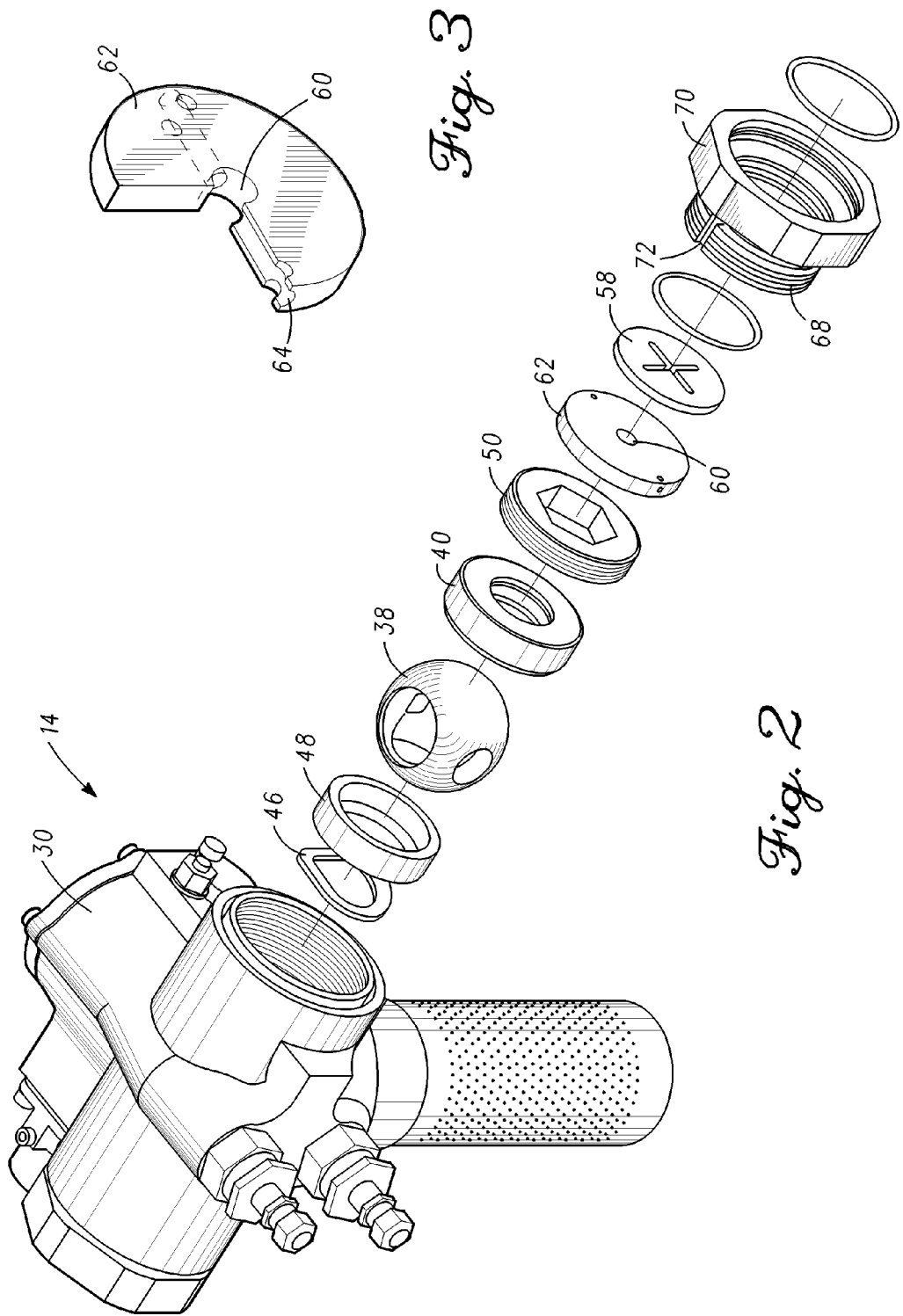

AIRCRAFT EVACUATION SLIDE INFLATOR HAVING VALVE LEAKAGE TRAP AND SAFETY VENT

BACKGROUND OF THE INVENTION

This invention relates to emergency evacuation equipment for aircraft, in particular, to inflators for inflatable aircraft emergency evacuation slides.

The requirement for reliably evacuating airline passengers in the event of an emergency is well-known. Emergencies at take-off and landing often demand swift removal of passengers from the aircraft because of the potential for injuries from fire, explosion, or sinking in water. A conventional method of quickly evacuating a large number of passengers from an aircraft is to provide multiple emergency exits, each of which is equipped with an inflatable evacuation slide. The inflatable evacuation slides are normally stored in an uninflated condition in a compartment requiring a minimum amount of space within the airframe. Door exit inflatable slides are typically either mounted on the interior of the aircraft door or immediate adjacent thereto. Overwing exits are normally stored in an uninflated condition in a special compartment that opens to the exterior of the aircraft adjacent to the overwing exit.

Modern evacuation slide inflation systems typically comprise a pressure vessel containing a stored pressurized gas, either alone or in combination with a pyrotechnic gas generator, used to supply the source gas for inflating the emergency evacuation slide. The pressure vessel is sealed by a control valve that opens in response to the emergency exit door being opened in the "armed" condition to inflate the inflatable evacuation slide. Regulations require inflation systems that use stored gas to have an overpressure relief valve to release gas in the event of over pressurization of the inflation system pressure vessel. Regulations do not require, and the prior art control valves to not have provisions to vent leakage through the control valve itself. Accordingly, it is possible for modest leakage past the control valve to result in an unintentional pressurization and accidental deployment of the emergency evacuation slide from a slow build-up of leakage pressure. Accordingly, what is needed is an inflation system control valve having a valve leakage trap and safety vent that safely vents valve leakage gas away from the inflatable evacuation slide without compromising the reliability of the control valve to fully inflate the inflatable evacuation slide in the event of an emergency.

SUMMARY OF THE INVENTION

The present invention solves the foregoing need by providing an inflatable aircraft evacuation slide system that includes a control valve with a primary valve member, a secondary valve member and a valve leakage trap operatively disposed between the first valve member and the second valve member. According to one embodiment of the invention, the primary valve member is a ball valve that seals the pressure vessel containing the inflation gas from a chamber that leads to the inflatable evacuation slide. The chamber is sealed from the inflatable evacuation slide by the secondary valve member, which comprises a burst disk. In operation, when the aircraft emergency exit is opened in the "armed" condition, the ball valve opens and pressurizes the chamber until the burst disk ruptures allowing inflation gases to inflate the inflatable evacuation slide. A flow restriction orifice in the gas path upstream of the burst disk regulates the flow of gases into the inflatable evacuation slide to prevent rupturing of the slide during inflation. The flow-restriction orifice includes a valve leakage trap and safety vent consisting of a small passage that connects the flow restriction orifice to the atmosphere. In the event of leakage past the primary valve, the valve leakage trap and safety vent safely vents pressure in the chamber to the atmosphere. During normal operation of the valve, however, since there is a substantial pressure drop across the flow restriction orifice, the presence of the valve leakage safety vent does not result in significant loss of inflation gas needed for inflating the inflatable evacuation slide.

BRIEF DESCRIPTION OF THE DRAWING

The present invention will be better understood from a reading of the following detailed description taken in conjunction with the accompanying drawing figures in which like references designate like elements and, in which:

FIG. 2 is a perspective view partially exploded of a control valve for use in the evacuation slide system of FIG. 1;

FIG. 3 is a perspective view, partially cut away, of a flow restriction orifice used in the control valve of FIG. 2.

DETAILED DESCRIPTION

Figure 1:
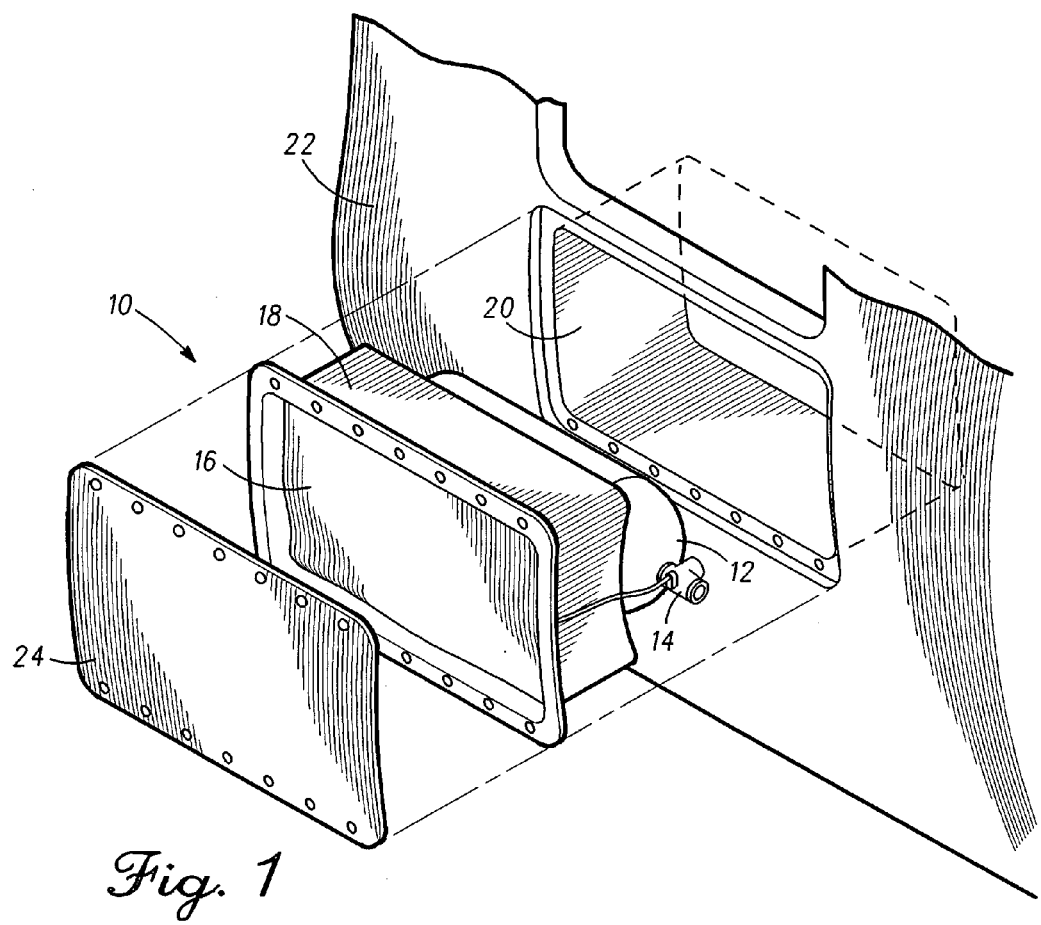
FIG. 1 is an exploded perspective view showing an inflation system incorporating features of the present invention.

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

With reference to FIG. 1, an inflatable aircraft evacuation slide system 10 incorporating features of the present invention comprises pressure vessel 12 containing a source of inflation gas, a control valve 14 and an inflatable evacuation slide 16 stored in an uninflated condition within a packboard compartment 18 is. Packboard compartment 18 secured within a recess 20 in the outer hull of aircraft 22 and covered by a cover panel 24. In normal operation, the opening of the aircraft emergency evacuation exit in the armed condition causes a signal to be sent to control valve 14 causing control valve 14 to open allowing inflation gas to flow from pressure vessel 12 to operate the locks allowing cover panel 24 to fall away and to inflate inflatable evacuation slide 16. Control valve 14 must open reliably when the emergency evacuation exit is opened, yet must seal pressure vessel 12 reliably for long periods of time between periodic inspections. Absent provisions to ensure valve leakage is directed away from the inflation lines, leakage past control valve 14 could result in the accidental release of cover panel 24 and inflation of inflatable evacuation slide 16.

Figure 4:
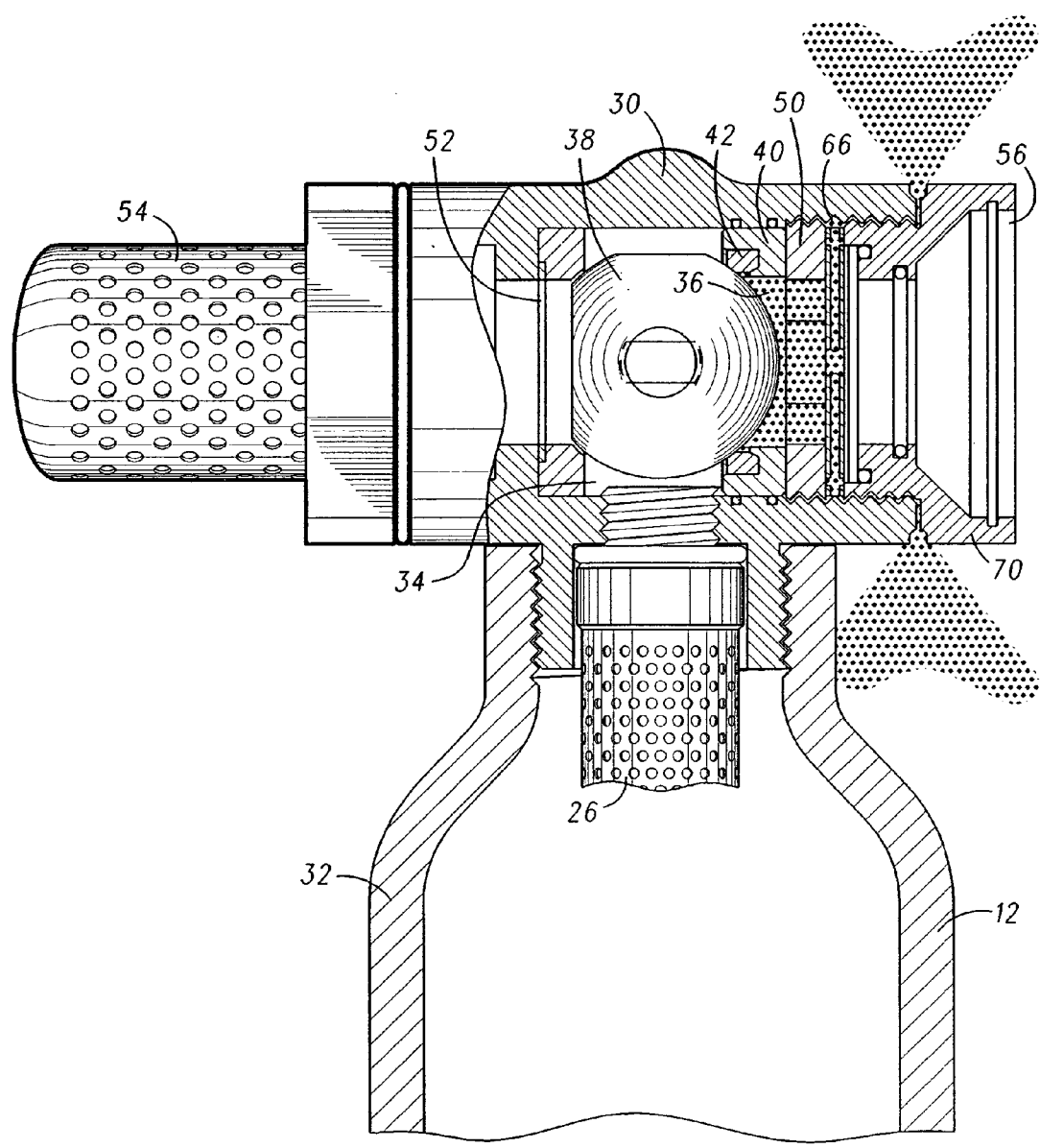
FIG. 4 is a cross-sectional view of the control valve of FIG. 2.

With reference to FIGS. 2-4, a control valve 14 having a valve leakage trap and safety vent incorporating features of the present invention comprises a valve body 30 attached to the outlet 32 of a pressure vessel 12 and a second chamber 36. Valve body 30 includes a first chamber 34 that is fluid communication with pressure vessel 12 via an inlet filter 26.

First chamber 34 is sealed from second chamber 36 by means of a ball valve comprising a ball valve member 38 that is seated against a valve seat assembly 40, which comprises a valve seat base 42 and a seal member 44. Ball valve member 38 is biased against valve seat assembly 40 by means of a conventional ball seat spring 46 and a collar 48 all of which are held in place by means of a conventional threaded retainer 50. First chamber 34 has an overpressure exhaust vent that is sealed by means of an overpressure burst disk 52. Overpressure burst disk 52 ruptures in the event pressure in first chamber 34 exceeds a predetermined safe pressure and vents the overpressure to the atmosphere through a neutral thrust diffuser 54.

Valve body 30 further includes an outlet port 56 that is connected to the inflatable evacuation slide by conventional means. Second chamber 36 is isolated from outlet port 56 by means of second valve member comprising a burst disk 58 which ruptures at a predetermined pressure (below that which the overpressure burst disk ruptures). In normal operation, when the aircraft emergency evacuation door is opened, the primary ball valve opens interconnecting first chamber 34 with second chamber 36. Pressure buildup in second chamber 36 causes burst disk 58 to rupture allowing inflation gas to pass from pressure vessel 12 through valve body 30 into inflatable evacuation slide 16. A flow restriction orifice 60 formed in orifice disk 62 throttles the flow of gas from pressure vessel 12 to a flow rate that is suitable for inflating an inflatable evacuation slide.

As shown in FIG. 3, in addition to having a flow restriction orifice 60, orifice disk 62 includes a valve leakage safety vent 64 that is cross-drilled through orifice disk 62 to intersect with flow restriction orifice 60. As shown most clearly in FIG. 4, in the event of leakage past ball valve member 38 of the primary ball valve, pressure accumulating in second chamber 36 is prevented from entering outlet port 56 by burst disk 58. Instead, the accumulated pressure in second chamber 36 enters flow restriction orifice 60 and is vented outside the valve through valve leakage safety vent 64, which communicates with the gap between female threads 66 formed in valve body 30 and male threads 68 of outlet connector 70. Optionally, one or more longitudinal grooves such as grooves 72 are formed in male threads 68 to improve flow.

Preferably the area of valve leakage safety vent 64 is no more than 10 percent of the flow rate of orifice disk 62, most preferably no more than 1 percent of the flow rate of orifice disk 62. In the illustrative embodiment, valve leakage safety vent 64 has a flow area no greater than 0.0006 square inches. Flow restriction orifice 60 has a flow area of at least 0.038 square inches. Accordingly, the flow area of flow restriction orifice 60 is at least 63 times larger than the flow area of valve leakage safety vent 64. Because valve leakage safety vent 64 intersects flow restriction orifice 60, under relatively static flow conditions such as a valve leakage event, valve leakage safety vent 64 is approximately the same pressure as second chamber 36 and therefore efficiently vents second chamber 36. During normal operation, however, the entrance loss effects of orifice disk 62 will cause the pressure at valve leakage safety vent 64 to be significantly less than the static pressure in second chamber 36. Accordingly, although in the illustrative embodiment valve leakage safety vent has approximately 1.5 percent of the flow area of flow restriction orifice 60, during normal operation valve leakage safety vent will vent substantially less than 1 percent of the flow passing through orifice disk 62.

Although certain illustrative embodiments and methods have been disclosed herein, it will be apparent from the foregoing disclosure to those skilled in the art that variations and modifications of such embodiments and methods may be made without departing from the spirit and scope of the invention. For example, although in the illustrative embodiment the valve leakage trap intersects flow restriction orifice 60 and vents into the threaded connection between valve body 30 and outlet connector 70, any method for providing low-flow venting of second chamber 36 is considered within the scope of the invention. Accordingly, it is intended that the invention shall be limited only to the extent required by the appended claims and the rules and principals of applicable law.

What is claimed is:

1. An inflatable aircraft evacuation slide system comprising:
    an inflatable evacuation slide stored in an undeployed condition;
    a source of inflation gas; and
    a control valve, said control valve comprising a valve body having an inlet port, a first chamber, a primary valve member, a second chamber, a secondary valve member, a primary outlet port fluidically interconnected to said inflatable evacuation slide, and a secondary outlet comprising an exhaust vent;
    said inlet port being disposed in a fluid path between said source of inflation gas and said first chamber, said inlet port being adapted to receive a flow of pressurized fluid from said source of inflation gas and to deliver said flow of pressurized fluid to said first chamber;
    said primary valve member being disposed in a fluid path between said first chamber and said second chamber, said primary valve member opening in response to an external signal to permit pressurized fluid to flow from said first chamber to said second chamber;
    said secondary valve member being disposed in a fluid flow path between said second chamber and said primary outlet port; said secondary valve member opening in response to a predetermined pressure in said second chamber to allow a flow of pressurized fluid from said second chamber into said primary outlet port for inflating said inflatable evacuation slide;
    said control valve further comprising a valve leakage trap, said valve leakage trap comprising a fixed, normally open fluid flow path from said second chamber to said secondary outlet.

2. The inflatable aircraft evacuation slide system of claim 1, wherein:
    said secondary outlet is capable of flowing no more than 10 percent the flow rate of primary outlet port.

3. The inflatable aircraft evacuation slide system of claim 1, wherein:
    said secondary outlet is capable of flowing no more than 1 percent the flow rate of primary outlet port.

4. The inflatable aircraft evacuation slide system of claim 1, wherein:
    said secondary outlet comprises a channel between mating male and female threads of a threaded connection, one of said male and female threads being formed in said housing.

5. The inflatable aircraft evacuation slide system of claim 4, further comprising:
    a longitudinal groove cut in said threaded connection.

6. The inflatable aircraft evacuation slide system of claim 1, wherein:
    said secondary valve member is a rupture disk.

7. The inflatable aircraft evacuation slide system of claim 1, wherein:
    said primary valve member is a ball valve.

8. The inflatable aircraft evacuation slide system of claim 1, wherein:
   said valve leakage trap comprises an orifice disk having a main orifice and a leakage orifice, said main orifice comprising an aperture extending axially through said orifice disk interconnecting said first chamber with said secondary valve member, said leakage orifice comprising a gas channel interconnecting said first chamber with said secondary outlet.

9. The inflatable aircraft evacuation slide system of claim 8, wherein:
   said orifice disk further comprises an outer edge; and
   said gas channel comprises a transverse aperture interconnecting said main orifice with said outer edge of said orifice disk.

10. The inflatable aircraft evacuation slide system of claim 1, further comprising:
   a tertiary outlet port; and
   an overpressure valve disposed in a fluid flow path between said first chamber and said tertiary outlet port, said overpressure valve being capable of opening in response to a predetermined pressure in said first chamber to permit pressurized fluid to flow from said first chamber to said tertiary outlet port.

11. The inflatable aircraft evacuation slide system of claim 10, wherein:
   said overpressure valve opens in response to a pressure level greater than that at which said secondary valve member opens.

12. An inflatable aircraft evacuation slide system comprising:
   an inflatable evacuation slide stored in an undeployed condition;
   a source of inflation gas; and
   a control valve, said control valve comprising a valve body having an inlet port, a first chamber, a primary valve member, a second chamber, a secondary valve member, a primary outlet port fluidically interconnected to said inflatable evacuation slide, a secondary outlet, and a tertiary outlet;
   said inlet port being disposed in a fluid path between said source of inflation gas and said first chamber, said inlet port being adapted to receive a flow of pressurized fluid from said source of inflation gas and to deliver said flow of pressurized fluid to said first chamber;
   said primary valve member being disposed in a fluid path between said first chamber and said second chamber, said primary valve member opening in response to an external signal to permit pressurized fluid to flow from said first chamber to said second chamber;
   said secondary valve member comprising a burst disk disposed in a fluid flow path between said second chamber and said primary outlet port; said burst disk rupturing at a first predetermined pressure in said second chamber to allow a flow of pressurized fluid from said second chamber into said primary outlet port for inflating said inflatable evacuation slide;
   said control valve further comprising a fixed, normally open fluid flow path from said second chamber to said secondary outlet for venting leakage past said primary valve member; and
   said tertiary outlet comprising a neutral thrust diffuser and an overpressure relief valve disposed in a fluid flow path between said first chamber and said neutral thrust diffuser, said overpressure relief valve being capable of opening in response to a second predetermined pressure in said first chamber to permit pressurized fluid to flow from said first chamber to said tertiary outlet port, said second predetermined pressure being greater than said first predetermined pressure.

* * * * *

UNITED STATES PATENT AND TRADEMARK OFFICE
CERTIFICATE OF CORRECTION

PATENT NO. : 7,287,727 B2  Page 1 of 1
APPLICATION NO. : 11/170871
DATED : October 30, 2007
INVENTOR(S) : Kevin Myers et al.

It is certified that error appears in the above-identified patent and that said Letters Patent is hereby corrected as shown below:

Column 2, line 47, "compartment 18 is. Packboard compartment 18 secured" should be changed to --compartment 18. Packboard compartment 18 is secured--

Signed and Sealed this

Twenty-fifth Day of December, 2007

JON W. DUDAS
*Director of the United States Patent and Trademark Office*